T. F. BINGHAM.
Bee Hive.
No. 59,170.
Patented Oct. 30, 1866.
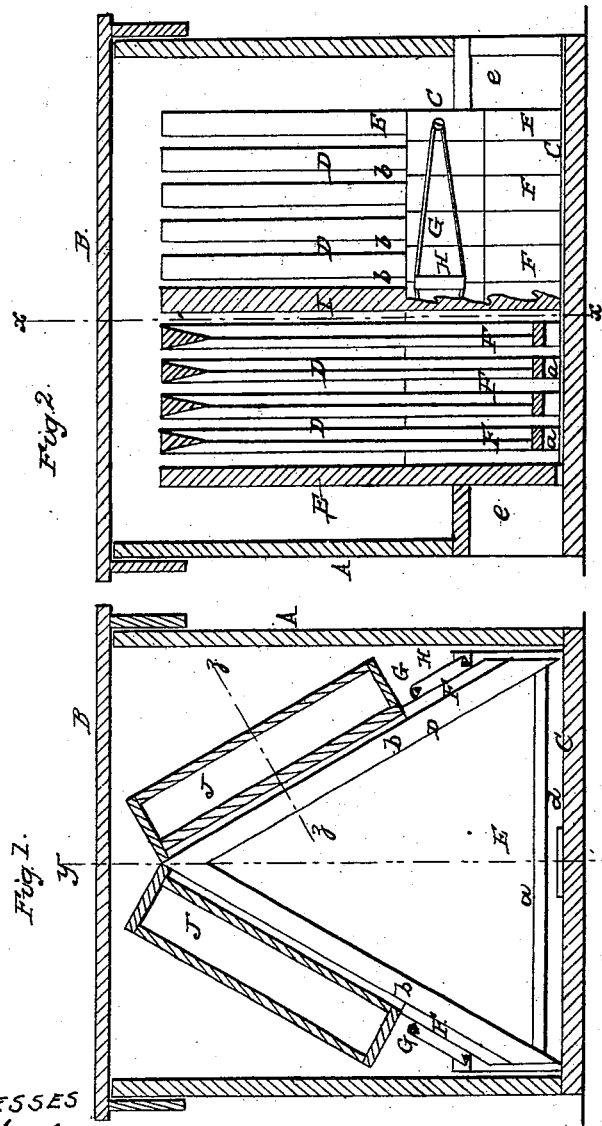
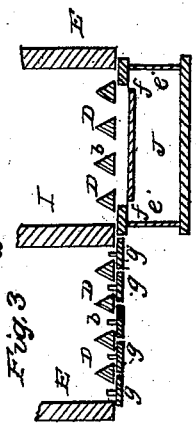

UNITED STATES PATENT OFFICE.

T. F. BINGHAM, OF GOWANDA, NEW YORK.

IMPROVEMENT IN BEE-HIVES.

Specification forming part of Letters Patent No. 59,170, dated October 30, 1866.

*To all whom it may concern:*

Be it known that I, T. F. BINGHAM, of Gowanda, in the county of Cattaraugus and State of New York, have invented a new and Improved Bee-Hive; and I do hereby declare that the following is a full, clear, and exact description thereof, which will enable others skilled in the art to make and use the same, reference being had to the accompanying drawings, forming part of this specification, in which—

Figure 1 is a transverse vertical section of my invention, taken in the line *x x*, Fig. 2; Fig. 2, a longitudinal vertical section of the same, taken in the line *y y*, Fig. 1; Fig. 3, a section of one side of the comb-frames with a spare-honey box thereon, taken in the line *z z*, Fig. 1.

Similar letters of reference indicate like parts.

The object of my invention is the construction of a bee-hive so cheap and simple that any one may use it without the aid of an expert, and yet one that shall embody all the principles necessary to successful modern bee-culture.

It has also for its object the construction of a frame answering the double purpose of walls to the hive and support to the combs, thus obviating any loss of room; also, shall form a convenient passage to and from the spare-honey receptacles, and combine the rare qualities of cheapness of construction, great strength, and ease in using.

It also has for its object the construction of movable ends, provided with broad bases to hold the combs in position during examination, protect the entrance when the outer case is packed, and admit of readily increasing or diminishing the size of the hive; and, furthermore, the use of a divider provided with guides like the guides of the frames and end pieces to facilitate the multiplication of colonies; also, the use of a brace which shall hold the end pieces, frames, and divider, when used, firmly together.

A represents a quadrilateral case or box, which serves as a covering for the hive proper, and is provided with a removable lid or top, B, and a close bottom, C, as shown in Figs. 1 and 2. The body or main portion of the hive, which may be termed the "hive proper," is composed of comb-frames D, of triangular form, as shown clearly in Fig. 1, and secured between triangular end pieces, E E, as follows: To the lower part of each side of the comb-frames D there are secured what I term "guides" F, the lower ends of which project down a trifle below the lower ends of the side pieces of the comb-frames, and serve as supports for the same, keeping their bottom slats, *a*, a suitable distance above the bottom C of the case or box A. These guides F are a trifle wider than the sides *b* of the comb-frames, as will be understood by referring to Fig. 2. The end pieces, E E, also have guides F attached to them at their lower parts, one at each side, and the end pieces and comb-frames are all secured or clamped firmly in contact with each other by means of a flexible wire loop or link, G, which is fitted on or over screws *c* in the guides F of the end pieces, E, and is strained by a bar, H, as shown in Fig. 2. By this simple means the comb-frames and end pieces are firmly bound together, and may be readily loosened, when necessary, for the removal of a comb-frame.

The end pieces, E E, rest on the bottom C of the case or box A, and have notches *d* made in their lower edges, to serve as bee-entrances, and projections *e* are attached to the lower ends of the outer sides of the end pieces, to serve as a protection to the entrances *d*, said projections forming vestibules or recesses, which extend through both sides of the case or box A, as shown in Fig. 2.

I represents what I term a "divider," which is a solid piece like the end pieces, E E, and of triangular form, like the comb-frames and end pieces. This divider has guides F attached to the lower parts of its sides, precisely like those of the end pieces and comb-frames. It will be seen, therefore, that this divider can be inserted at any desired point in the portion of the hive that is the part formed by the comb-frames and end pieces, and said part divided as circumstances may require.

J represents the spare-honey boxes, which rest on the sides of the comb-frames D, and are supported by the guides F. (See Fig. 1.) These boxes J may be constructed with glass sides *e'*, and they have longitudinal openings *f* in their bottom to admit the bees. When these boxes are removed, the spaces between the comb-frames are covered by slats *g*, as shown in Fig. 3. The boxes J, it will be seen by referring to Fig. 1, occupy the space in the box or case A above the comb-frames.

The advantages of the within-described bee-hive and the purposes accomplished by it may summed up as as follows:

First, the construction of comb-frames which shall form the cavity of the hive, not fill it with useless material.

Second, the storing of sufficient honey in the combs on which the bees cluster to carry any stock safely through the winter. Such large combs assist greatly in wintering bees and in the development of brood in summer.

Third, the absolute certainty of securing straight combs. The bees, always beginning the combs at the apex of the frames, will invariably follow their sides, thus rendering said combs easy of examination or removal.

Fourth, as the honey is gradually consumed and the bees steadily diminish in the winter, the place they occupy narrows, as it were, the hive grows smaller, so that the swarm, however small, still has a hive adapted to its wants. The warmth concentrating where the honey is, the bees will never starve while any remains, the reverse of this being more frequently the case in flat hives than otherwise.

Fifth, large surface for spare-honey boxes, while the hive proper is small and compact.

Sixth, great strength, cheapness, and ability to support large combs.

The ends of the hive are triangular, provided with guides corresponding with the frames, an entrance for the bees, and projecting feet on which they rest.

The purposes accomplished are:

Seventh, suitable end pieces to the hive, the bases of which may be slipped through the openings in the outer case, for the admission of more frames or the divider without enlarging said outer case.

Eighth, to prevent the obstruction of the bee-entrances when the outer case is packed with shavings or other non-conducting material for the protection of the bees in winter, and to preserve an even temperature in and exclude the light from the boxes in summer.

Ninth, a wide base capable of holding the frames in position when the braces are removed and the hive examined.

The divider is triangular, having guides corresponding with the frames and end pieces. The guides hold the divider in position and at the same distance from the combs that the combs are from each other, securing a free passage between the combs and divider, also support the strips that cover the passages to the boxes when the boxes are not in use.

In no hive yet in use has the multiplication of colonies by division been a success. The principle seems plausible, even practicable; but the results thus far have not been successful. The plan adopted in this hive differs materially from all others.

Tenth, in the flight of the bees on both sides at right angles with the line of the combs, thus securing abundance of bees to each part of the hive after division, without changing their entrance in the least.

Eleventh, the few large combs of which the hive is composed, and to which the queen has had free access, precludes the possibility of failure in raising a new queen in the part of the hive left queenless from lack of fresh eggs or young worker-bees—two of the most fruitful sources of failure in multiplying colonies by division.

What I claim as new, and desire to secure by Letters Patent, is—

1. The triangular frames D, divider I, and notched end pieces, E, and guides F resting thereon, the triangular end pieces, E, slats $a$, links G, bar H, spare boxes J, and slats $g$, when combined and operating substantially as described, for the purpose specified.

2. The construction of the triangular end pieces, E E, with bee-entrances and vestibules, as set forth.

3. A triangular divider, I, with guides constructed substantially as set forth.

4. The clamp G, constructed as described, and arranged in connection with a bar, H, substantially as and for the purpose specified.

5. Arranging the comb-frames D, end pieces, E, divider I, clamp G, cover strips or slats $g$, boxes J, and outer case, A, substantially as and for the purpose specified.

T. F. BINGHAM.

Witnesses:
CHS. C. MUNGER,
NEWTON A. CHAFFE.